United States Patent [19]
Birkinshaw

[11] Patent Number: 5,296,816
[45] Date of Patent: Mar. 22, 1994

[54] INTEGRATED CIRCUIT SENSOR AND DETECTOR AND SPECTROMETERS INCORPORATING THE SENSOR

[75] Inventor: Keith Birkinshaw, Machynlleth, Wales

[73] Assignee: Fisons Plc, Ipswich, United Kingdom

[21] Appl. No.: 820,862

[22] PCT Filed: Jun. 29, 1990

[86] PCT No.: PCT/GB90/01003
§ 371 Date: Jan. 16, 1992
§ 102(e) Date: Jan. 16, 1992

[87] PCT Pub. No.: WO91/00612
PCT Pub. Date: Jan. 10, 1991

[30] Foreign Application Priority Data
Jun. 29, 1989 [GB] United Kingdom ............ 8914910.8

[51] Int. Cl.$^5$ .................... G01R 29/12; G01R 5/28; H01J 49/02; G01T 1/28
[52] U.S. Cl. .................... 324/457; 324/72; 324/109
[58] Field of Search ............... 324/72, 452, 457, 458, 324/109

[56] References Cited

FOREIGN PATENT DOCUMENTS

90/03043 3/1990 World Int. Prop. O.

OTHER PUBLICATIONS

Padmore, et al, "A Fast Multianode Detector for Solid State Ultraviolet Photoelectron Spectroscopy" Nucl Instrum. Meth. in Phys. Res. 1988 vol. A270(2-3) pp. 582-589.
Gurney, Ho, Richter et al, "Multidetector Electron Energy-Loss Spectrometer for Time-Resolved Surface Studies" Rev. Sci. Instrum. 1988 vol. 59 (1) pp. 22-44.
Timothy, Bybee, "Multianode Microchannel Array Detectors for Space Shuttle Imaging Applications" Proc. SPIE, 1981 vol. 265 pp. 93-105.
Timothy, Bybee, "One-Dimensional Photon-Counting Detector Array for Use at Euv and Soft X-Ray Wavelengths" Appld. Optics. 1975 vol. 14 (7) pp. 1632-1644.
Liptak, Sandie, et al, "Microchannel Plate Electron Multiplier for Mass Spectrometer Applications" IEEE Trans. Nucl. Sci. 1984 vol. NS-31 (1) pp. 780-785.
Krider et al, "A Multiwire Secondary Emission Beam Profile Monitor with 20 IM Resolution" Nucl Instum. Meth. in Phys. Res. 1986 vol. A247 (2) pp. 304-308.
Tobita et al, "Absolute Detection Efficiency of a Microchannel-Plate Detector for Ions and Neutrals" Japan J. Appld. Phys. pt. 1, 1987 vol. 26 (3) pp. 509-510.
Hatfield, York, Comer, Hicks, "Development of a New Type of Self-Scanned Electron Image Sensing Integrated Circuit" IEEE J. Solid State Circuites, 1989 vol. 24 (3), pp. 704-710.

(List continued on next page.)

Primary Examiner—Gerard R. Strecker
Attorney, Agent, or Firm—Merchant & Gould Smith, Edell, Welter & Schmidt

[57] ABSTRACT

A sensor for electrical charge fabricated as an integrated circuit and including an electrode (1) for receiving charge, a potential-sensitive switching device (2) for generating a pulse whenever the charge received on the electrode (1) is sufficiently great, a counting device (4) for counting the number of times the switching device operates, and a member (3) for restoring the potential on the electrode (1) to its initial potential each time the switching device (3) operates and/or continuously towards its initial potential. An integrated circuit having an array of such sensors and digital logic for controlling their operation is included. The array may be used as a multiple-channel detector for charged particles, particularly as a detector for electrons emerging from a channel plate electron multiplier. Dispersive particle and photon spectrometers, especially mass spectrometers, using such a detector are also provided.

39 Claims, 6 Drawing Sheets

OTHER PUBLICATIONS

Walker, Parker, Hyams, Shapiro, "Development of High Density Readout for Silicon Strip Detectors" Nucl Instrum. Meth. Phys. Res. 1984 vol. 226 pp. 200–203.

Boettcher, Donat, Leiste et al., "Performance of Silicon Strip Detectors with 50 and 100 IM Strip Distance" Nucl Instrum. Meth. Phys. Res. 1984 vol. 226 pp. 72–77.

Zimmer, "Technology for the Compatible Integration of Silicon Detectors with Readout Electronics" Nucl Instrum. Meth. Phys. Res. 1984 vol. 226 pp. 175–184.

Jarron, Goyot, "A Fast Current Sensitive Preamplifier (MSD2) for the Silicon Microstrip Detector" Nucl Instrum. Meth. in Phys. Res. 1984 vol. 226 pp. 156–162.

Gatti, Manfredi, "Present Trends and Realisations in Readout Electronics for Semiconductor Detectors in High Energy Physics" Nucl Instrum. Meth. in Phys. Res. 1984 vol. 226 pp. 142–155.

Heijine, Higon, Jarron et al., "Development of Hardware Around a Silicon Microstrip Detector with 512 Elements" Nucl Instrum. Meth. in Phys. Res. 1984 vol. 226 pp. 63–67.

Hofman, Lutz, Hosticka et al. "Development of Readout Electronics for Monolithic Integration with Diode Strip Detectors" Nucl Instrum. Meth. in Phys. Res. 1984 vol. 226 pp. 196–199.

Hosticka, "Prospects of VLSI Readout" Nucl Instrum. Meth. in Phys. Res. 1984 vol. 226 pp. 185–189.

Radeka, "Semiconductor Position-Sensitive Detectors" Nucl Instrum. Meth. in Phys. Res. 1984 vol. 226 pp. 209–218.

Epperson, Sweedler, Bonner Denton et al. "Electro-Optical Characterization of the Tektronix TK512M-011 Charge-Coupled Device" Opt. Eng. 1987 vol. 26 (8) pp. 715–724.

Hicks, Wallbank, Bury, Comer, "A Multidetector System for Electron Spectrometers" Proc. Confr. Influence of Microelect. on Meas. Instrum. and Transducer Design, London, 1982 (IEEE) pp. 167–174.

INTEGRATED CIRCUIT SENSOR AND DETECTOR AND SPECTROMETERS INCORPORATING THE SENSOR

This invention relates to single and multiple channel charge sensors fabricated in the form of integrated circuits and to various types of spectrometers incorporating them.

Scanning type dispersive spectrometers are limited in efficiency because only a small proportion of the signal representing the complete spectrum of a sample is recorded on a single channel detector at any given moment during the scan. It is known that efficiency can be increased by the use of a multiple channel detector which can register at least a significant part of the spectrum simultaneously. In the case of a charged particle spectrometer, e.g., a mass or electron energy spectrometer, prior multichannel detectors typically comprise one or more channel plate electron multipliers which receive the charged particles comprising the spectrum to be recorded and produce an intensified electron image therefrom. A multiple channel charge sensor then converts the electron image into electrical signals which can be processed by a computer. Several different types of charge sensors have been employed, for example a phosphor screen on which charged particles impact to produce photons, connected by a fibre optical link to an optical detector system such as a television camera, photodiode or CCD array with appropriate electronics. Another type of charge sensor comprises a multianode array with individual charge sensitive amplifiers for each anode. Position sensitive detectors such as resistive strip or wedge and strip detectors are also used, particularly in the case of electron energy spectrometers, but because they can record the position of only one event at a time they are of limited use in most spectrometric applications.

Unfortunately the performance requirements of a multiple channel detector suitable for charged-particle spectrometers are very demanding. This is especially true of high resolution mass spectrometers which require a large number of closely spaced channels if both the mass range and resolution are to be maintained. Further, the sensitivity advantage of multiple channel detectors is only useful if the speed of the detector and of its associated electronics is sufficiently great. Prior types of detectors have up to now failed to provide a cost-effective improvement to the performance of good quality single channel detector mass spectrometers.

Of the presently available charge detecting systems, the multianode array appears to offer the best prospects of adequate performance because it is capable of true simultaneous detection with a short dead time and with a resolution determined only by the spacing of the anodes. However, the practical problems of producing an array of a sufficient number of anodes (several thousand are necessary for a high resolution mass spectrometer) and the associated electronics, are very great. Each anode requires its own charge sensing circuit and the provision of a thousand external amplifiers and the associated wiring is impractical. It is obvious, however, that the problem could be solved in principle by the use of an integrated circuit which comprised at least the anodes and the associated charge sensors and a data acquisition circuit for multiplexing the outputs of the charge sensors to a reasonable number of external connections.

Multianode detectors comprising a relatively small number of anodes and external charge sensors and which are suitable for use with channel plate electron multipliers have been realised by Padmore (Nucl. Instrum. and Meth. in Physics Research 1988 vol A270-(2-3) pp 582-9), Gurney, Ho, Richter and Villarrubia (Rev. Sci. Instrum. 1988 vol 59(1) pp 22-44), Timothy and Bybee (Proc. SPIE 1981 vol 265 pp 93-105 and Applied Optics 1975 vol 14 (7) pp 1632-44) and Liptak, Sandie, Shelley and Simpson (IEEE Trans. Nucl. Sci. 1984 NS-31(1) pp 780-785). However, arrays of more than 500 anodes have only been realised by the use of coincidence arrays which involve the use of 2 sets of electrodes for coarse and fine positioning respectively. These are unsuitable for most spectroscopic applications for the same reasons as simple position sensitive detectors.

Hicks and Hatfield (PCT application publication number WO 90/03043, published March 1990) describe a multianode detector for use with a channel plate electron multiplier in which the charge sensors and the anodes are fabricated as an integrated circuit. This is discussed in detail below.

A variety of different types of charge sensor circuits suitable for use with multianode detectors are known. These typically comprise a charge-sensitive preamplifier and integrator circuit which feeds a discriminator to provide a digital output signal whenever the charge on the anode reaches a certain level. All the prior systems are characterised by the need for an external clock generator to control the function of the sensor, and it is this clock which determines when a particular anode, a group of anodes, or even the entire array, is able to respond to another electron pulse from the channel plate multiplier. The circuit incorporated in the Hicks and Hatfield integrated detector is typical of these prior systems. In this circuit, the electrode is connected through an amplifier (a conventional CMOS inverter) to a storage capacitor during the "sample" part of the clock cycle, and simultaneously a reference capacitor is charged from a stable reference voltage. During this phase, any charge arriving at the anode is amplified and stored in the storage capacitor. During the second part of the clock cycle the amplifier and reference voltage source are disconnected from the capacitors and the voltages present on the capacitors are compared by a CMOS comparator stage. During the third part of the clock cycle the output of the comparator is used to increment a counter if the potential of the storage capacitor has been found to exceed that on the reference capacitor. During the fourth part of the cycle the amplifier is short-circuited to discharge the capacitance associated with the anode and both capacitors are charged to a suitable voltage level in preparation for the next measurement cycle. The complexity of this circuit and its power dissipation would appear to preclude the production of an integrated circuit using currently available fabrication methods which has a sufficient number of electrodes for use in a high resolution mass spectrometer.

The chances of successful fabrication and of high reliability of the integrated circuit so produced are increased by reducing the complexity of the circuit associated with each anode so that yield and power dissipation problems are minimised. A less complicated circuit is also smaller, which allows closer spacing of the anodes. It is therefore an object of the present invention to provide an integrated circuit charge sensor and an array of such sensors which are suitable for the most demanding spectroscopic applications and which are less complicated than prior sensors. It is another object to provide a multiple channel detector employing such sensors, and various types of spectrometers incorporating such a detector.

The invention therefore provides a sensor for electrical charge comprising:
a) an electrode for receiving charge;
b) means for initially setting the potential of said electrode to a selected potential;
c) potential sensitive switching means for monitoring the potential of said electrode, said switching means operable whenever, in response to the arrival of charge at said electrode, the potential of said electrode deviates from said initially set potential by more than a preselected amount;
d) means for restoring the potential of said electrode
  1) to substantially said selected potential whenever said switching means operates, and/or
  2) continuously towards said selected potential;
e) means for counting the number of times said switching means operates;
wherein said electrode, said means for initially setting, said potential sensitive switching means, said means for restoring and said means for counting are fabricated as an integrated circuit.

In preferred sensors the switching means is non-latching. Further preferably, the switching means resets after the potential on the electrode returns to substantially the initially selected potential. In this way a pulse is generated by the switching means, and counted by the counting means, each time the electrode potential deviates from the initially set potential sufficiently to operate it. The pulse is automatically terminated by the means for restoring which resets the electrode potential in one (or both) of the following ways.

Firstly, the means for restoring may cause the electrode potential to be reset by switching it to a fixed source of potential (the initially set potential) as soon as the switching means has operated. If the switching means does incorporate some form of latching, then the latch is also reset at the same time. Otherwise, the switching means is automatically reset, as explained. This mode of operation is useful when the sensor is required to detect a substantially continuous flux of charge, in which case the frequency of pulses generated is dependent on that flux Secondly, the means for restoring may comprise means for continuously restoring the potential of the electrode towards the initially set potential, for example, through a resistor connected between the electrode and the source of potential. The restoring process will of course not be instantaneous but its rate will be dependent on the time constant of the restoring circuit, that is, the product of the resistance and all the capacitance associated with it. In order for the switching means to operate the rate of arrival of charge must exceed a minimum value sufficient for it to change the potential of the electrode enough for the switching means to operate before the charge leaks away through the resistor This mode of operation is particularly advantageous when the sensor is used to detect pulses of charge, such as might result from the impact of an ion on a channel plate electron multiplier. It has the effect of leaking away small accumulations of charge on the electrode without spurious counts being generated and provides a sensor which responds only to sufficiently large and fast pulses. Small amounts of charge never accumulate to give spurious counts, and such a sensor is well suited to use with a channel plate multiplier where it reduces the problem of charge spillover (or "blooming") due to one ionic impact activating more than one multiplier channel and/or electrode in an array of sensors.

The maximum count rate of a sensor using only the second mode will of course be limited because the electrode must be substantially discharged before the switching means resets and the circuit is able to respond to another charge pulse. The most preferred form of charge pulse sensor therefore incorporates both modes of restoring the potential of the electrode. Thus the circuit is reset as soon as a pulse has been generated, which results in very efficient operation, but small amounts of charge never trigger the switching means and are leaked away by the resistive path, minimising "blooming" problems.

In the following, and in the above in so far as it is applicable, the term "switching" is meant to include the relatively gradual transition from a non-conducting to a conducting state, or v.v. The term "conducting" is not necessarily meant to imply a very low resistance path such as might be obtained through a mechanical switch, but rather a much lower resistance than the "non-conducting" state of a device such as a transistor.

In a preferred form for sensing negative charge the switching means may comprise a p-channel MOS transistor with its gate connected to the electrode and biased by the initially set potential to a point such that it switches from a non-conducting to a conducting state whenever the potential of the electrode changes more than a predetermined amount. This predetermined amount, and hence the sensitivity of the switching means, can be varied simply by adjusting the initially set potential. The closer this potential is to the switching potential, the smaller the amount of charge that can be detected, but this is achieved at the expense of noise immunity.

In a preferred form of sensor for positive charge, the switching means may comprise a n-channel MOS transistor with its gate connected to said electrode and biased by said initially selected potential to a point such that it switches from a non-conducting to a conducting state whenever the potential of said electrode deviates by more than a predetermined amount from the initially selected potential in response to the arrival of positive charge at said electrode.

In both positive and negative charge sensors the switching of the transistor from a non-conducting to a conducting state is used to generate a digital signal which increments the counting means. The automatic restoring of the electrode potential terminates the pulse without the need for any additional circuitry.

Although the switching means may comprise only a single MOS transistor, a better version may be implemented by adding a second MOS transistor driven by the first to provide during the switching process a signal which is fed back to the first transistor to dynamically alter its bias and ensure a more positive switching action. This can increase the sensitivity of the switching means to small quantities of charge. However, care must be taken in the design of such an arrangement, particularly regarding the selection of the resistances of the conducting states of both transistors (determined by their physical sizes) to avoid the feedback acting in reverse and reducing the sensitivity of the switching means. It will also be appreciated that the length of the output pulse generated is determined by the speed of the response of the means for restoring the potential of the electrode as well as the switching time of the switching means. All these factors are critical in designing a circuit of adequate sensitivity, and proper optimization of the design can only be achieved by computer simulation of its performance.

A sensor according to the invention is therefore distinguished from prior charge sensors at least partly by the absence of any external clock. This not only reduces the complexity of the circuit but also reduces the dead time of the sensor because it is capable of receiving another pulse as soon as the switching means has operated. In contrast, prior sensors are unable to monitor charge during a significant proportion of the clock cycle, especially if the cycle time is sufficiently short to permit acquisition at rates fast enough for use at high count rates in a high resolution mass spectrometer.

Prior sensors also rely on amplification of the charge on the electrodes before integrating it for a fixed time on a capacitor. This is necessary in systems involving external electronics because the capacitance of the wiring is so high that a single electron multiplier pulse cannot vary the capacitor potential sufficiently to allow reliable detection without amplification. In the present invention, advantage is taken of integrated circuit fabrication techniques to reduce the electrode capacitance to a value well below that in prior discrete component circuits so that a larger voltage change is produced by a given charge. This enables the charge sensor circuit to be simplified which in turn facilitates the production of an array comprising many more sensors than was previously possible. Such an array is useful in conjunction with one or more channel plate electron multipliers to make a multiple channel detector suitable for a spectrometer, especially but not exclusively a high resolution mass spectrometer.

In the case of an array of sensors, also fabricated on the substrate on which the electrodes and pulse forming circuits are fabricated will be relatively conventional digital circuitry for reading the counts accumulated in the counters and outputting that data in a form which can be processed by an external computer These circuits may vary according to the number of sensors in the array. Typically they will comprise an interface circuit associated with each counter which outputs the count to a local data bus when required. A plurality of local buses may be provided each servicing a group of sensors. All the local data buses are connected via buffers to a main bus which is taken to external connections on the chip to feed an external computer. Typically the interface circuit will comprise a number of tristate buffers which relay data from the counters to the data bus on receipt of an enable signal.

It is important that counter dead time during readout is kept to a minimum. This may be done by enabling the buffers of each interface circuit in turn by a series of "read" pulses from the external computer. The first read pulse causes the count stored by the first counter in the array to be outputted to the bus, and this process may arm the second counter and interface so that the next read pulse outputs the count stored by the second counter. The first interface is then reset and its counter zeroed, enabling that counter to restart counting while subsequent sensors are being read. The process continues until all the sensors have been read, and then may automatically restart. In this way, counter dead time is minimized.

Data may be accumulated until any one counter reaches a predetermined count, at which point counting on all the sensors may be stopped and a read cycle of all the counters is initiated. This ensures that relative peak intensities in a spectrum are maintained. Alternatively, readout may be carried out continuously as described above, and any counter reaching the predetermined count may simply be inhibited from further counting while counting continues on all the other counters in the array. This mode allows very weak peaks to be recorded at the expense of a distorted spectrum in which large peaks will be saturated.

Very large sensor arrays may be made by butting together several separate chips and extending the main bus from one chip to the next.

In the case of spectrometers which disperse only along one axis, advantage may also be had by providing a detector comprising two arrays of sensors disposed on either side of a line parallel to or coincident with the dispersion axis of the spectrometer so that the same portion of the spectrum is imaged on both arrays simultaneously. This may be done by fabricating two arrays of sensors on a single substrate or by butting together chips comprising a single array of sensors with the joint parallel to or coincident with the dispersion axis. If the chips are butted so that the individual electrodes are staggered by one-half their width, the problem of occasional malfunctioning sensors in an array is alleviated, and the resolution of the detector system can be increased beyond that attainable with a single chip because the number of sensors in a given length is increased.

An array of sensors may comprise a silicon substrate on which a circuit implementing the functions described is fabricated using relatively standard CMOS technology, preferably with $3\mu$ long polysilicon gates. The electrodes preferably comprise elongate metallic strips (e.g., aluminium) deposited on an insulating film which is coated over the completed circuit. Preferably the insulating film is polyimide, at least $10\mu$ thick in order to keep the electrode capacitance sufficiently low. Preferably the charge-sensing circuitry associated with an electrode is disposed beneath that electrode. Typically the electrodes may be about 4 mm long and $15\mu$ wide.

The invention further provides a dispersive spectrometer for photons or other particles (e.g., electrons, ions, etc, or neutral particles) having a focal plane in which at least a part of the spectrum is simultaneously imaged. The spectrometer may comprise multiple-channel particle multiplying means disposed in the focal plane which is sensitive to the photons or particles and which produces an intensified electron image on an array of sensors substantially as described above.

Typically the multiple-channel particle multiplying means will comprise one or more channel plate electron multipliers and the charge sensor array will be adapted to detect the pulses of electrons which are emitted from the channel plate as a result of the impact of photons, electrons or ions, etc, on its entrance face. The spectrometer may be a dispersive electron energy spectrometer or a mass spectrometer, particularly a high-resolution mass spectrometer. Optical (either UV, IR, or visible light) dispersive spectrometers may also be fitted with a detector as described, in which case the multiplying means will be sensitive to photons of the wavelength in use.

Preferred embodiments of the invention will now be described in greater detail by way of example only and with reference to the figures, wherein.

Figure 1:
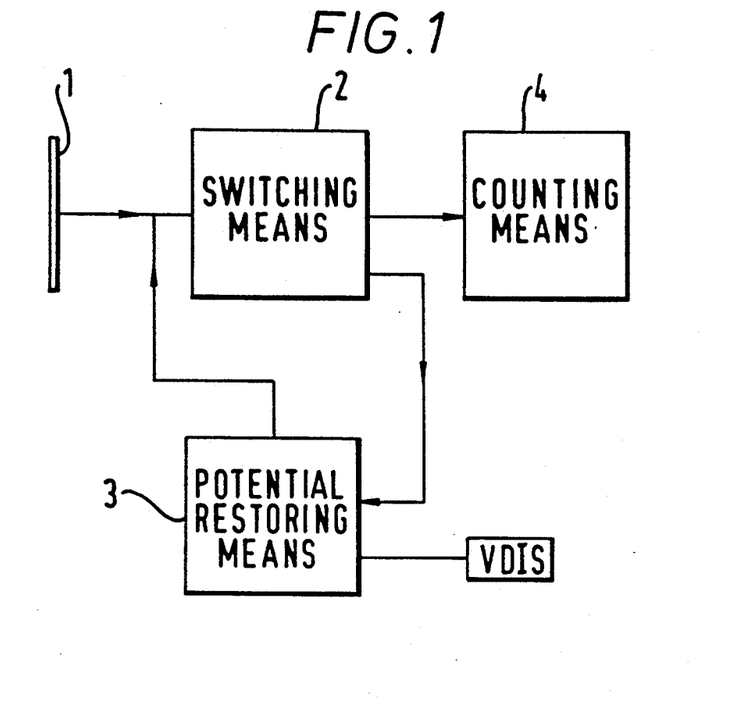
FIG. 1 is a block diagram of a charge sensor according to the invention.

Referrring first to FIG. 1, the potential on an electrode 1 for receiving electrical charge is monitored by a potential sensitive switching means 2 which generates a digital output capable of incrementing a counting means 4 each time it operates. The potential on the electrode 1 is initially set at a selected potential VDIS by the means 3 discussed below. Arrival of charge (e.g., a flux of electrons) at the electrode 1 causes its potential to deviate from VDIS, and the switching means 2 operates if and when that deviation is greater than its threshold, incrementing the counting means 4. The means 3 for restoring the potential of the electrode also serves as a means for initially setting its potential and operates in one or both of two ways. Firstly, it may connect electrode 1 to the fixed potential VDIS, typically through a switching transistor, immediately when the switching means 2 has operated If the switching means is non-latching, as is preferred, the connection of the electrode 1 to the fixed potential VDIS automatically returns the sensor to its initial condition. If the switching means incorporates a latch, this may also be reset by the means 3, thereby returning the sensor to its initial condition. Secondly, means 3 may continuously operate to restore the potential of electrode 1 towards VDIS, typically by providing a resistive path between electrode 1 and VDIS. Particularly when the sensor is to be used for detecting pulses of charge, means 3 may incorporate both ways of restoring the potential of the electrode.

Figure 2:
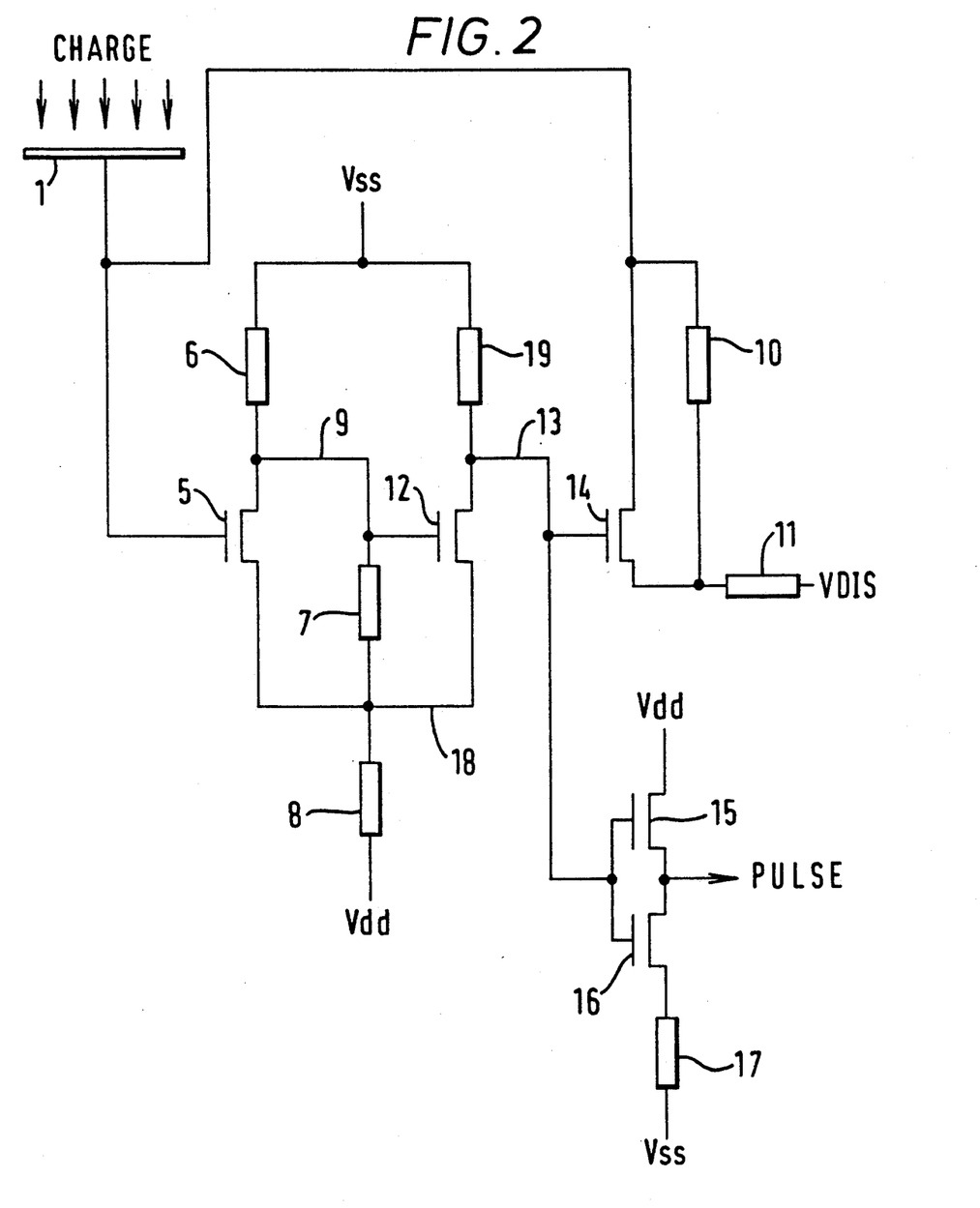
FIG. 2 is a circuit diagram of a preferred type of the sensor of FIG. 1.

Switching means 2 may be implemented for a negative charge sensor by a p-channel MOS transistor 5 and the associated resistors 6,7 and 8, as shown in FIG. 2. Electrode 1 is connected to the transistor gate and is maintained at the potential VDIS through resistors 10 and 11. VDIS is selected so that the transistor 5 is biased into a non-conducting state so that arrival of negative charge at the electrode 1 will cause transistor 5 to switch to a conducting state VDIS may be adjusted to select the sensitivity of the sensor by setting a threshold for the switching of transistor 5. If VDIS is close to the actual switching potential of transistor 5, the amount of charge needed to switch the transistor will be small, so that the sensitivity will be high, but the noise immunity will be less. Moving VDIS away from the actual switching potential will reduce the sensitivity but increase the immunity to noise.

When transistor 5 changes state, a second p-channel transistor 12 is switched from the conducting to a non-conducting state via the connection 9. This causes a third p-channel transistor 14 to be switched on via connection 13, thus connecting electrode 1 to the potential VDIS via resistor 11, and so restoring the electrode potential immediately to VDIS. As the electrode potential is restored the three transistors return to their original states (that is, transistors 5 and 14 non-conducting, transistor 12 conducting). A pulse is therefore generated on connection 13 and is relayed to a pulse shaper comprising a p-channel transistor 15, an n-channel transistor 16 and the resistor 17 connected as a conventional CMOS inverter.

In the FIG. 2 circuit the transistor 12 also provides a signal which is fed back to the first transistor 5 by connection 18 to dynamically alter its bias and make the switching action more positive A more detailed description of how the circuit switches is given below. When a charge pulse arrives at electrode 1, transistor 5 begins to switch to a conducting state so that the potential on connection 9 begins to rise towards $V_{dd}$. This causes transistor 12 to begin to switch to the non-conducting state, which results in connection 18 rising towards $V_{dd}$, but less so than connection 9. This results in the potential difference between electrode 1 and connection 18 increasing, which causes transistor 5 to switch further towards the conducting state, and reinforces the switching action. As the feedback process continues, the potential on connection 13 falls sufficiently to cause transistor 14 to switch to a conducting state, starting the discharge of electrode 1 in the manner explained. The resulting change in potential on electrode 1 causes transistor 5 to begin to switch towards a non-conducting state, and this process is reinforced by the feedback from transistor 12 and connection 18, eventually resulting in transistor 12 becoming conductive and terminating the output pulse generated on connection 13.

It will be seen that the pulse generation is a complex process dependent on the time constants of the switching of the various transistors, the electrode capacitance, and the relative values of the resistors and resistances of the transistors in their conductive states. It is necessary to optimize all these parameters in order to fabricate a switching circuit of optimum performance This can be done by the use of circuit simulation computer programs which are well known. One important feature is that the potential on connection 9 changes more than that on connection 18 as the circuit begins to switch. If the resistance values were such that the reverse were true, the effect of transistor 12 would be to decrease the sensitivity of the circuit because a greater potential change on electrode 1 would then be necessary to generate a pulse. The additional time delay introduced by transistor 12 is also important, allowing connection 13 to discharge to a potential closer to $V_{ss}$ through resistor 19 when transistor 12 becomes non-conducting, thereby generating a larger pulse on connection 13 before the operation of transistor 14 results in transistor 12 being switched on again.

It will be seen that transistor 14 provides a means for restoring the potential of electrode 1 to the initially selected value (VDIS) immediately when transistors 5 and 12 have switched. This process of course resets the circuit ready for the next arrival of charge. Additionally, resistor 10 provides a means for continuously restoring the potential of the electrode towards VDIS as well as for initially setting it. The value of the resistor 10 is chosen so that the time constant of the restoring process is an order of magnitude greater than the average pulse length that the circuit is designed to detect. In the case of an electron multiplier, the pulse resulting from the impact of a particle is typically about 1 nS duration so that resistor 10 should be selected to give a time constant of about 20 nS. The presence of resistor 10 will have very little effect on the operation of the switching circuit with a 1 nS pulse but is effective in reducing "blooming" in channel plate multiplier systems which can result from the electrons produced by a single impact on the multiplier plate falling on more than one sensor electrode. In the absence of resistor 10 this results in a build-up of charge on the sensors adjacent to that which should properly receive the charge, eventually giving spurious counts. A value of about 200 Kohm for resistor 10 is suitable in a sensor array fabricated as described below wherein a typical electrode capacitance is about 0.2 pF.

The circuit shown in FIG. 2 requires a potential change on electrode 1 of about 0.2 volts for reliable operation. With the below fabrication techniques it can detect a charge of about $0.5 \times 10^{-13}$ coulomb, which is adequate to detect the pulse of electrons resulting from a single particle impact with a conventional channel plate electron multiplier system. Reducing the size of the electrode will of course reduce the capacitance and increase the sensitivity, but the minimum useable electrode size will be determined by the requirement to collect charge over a particular area.

The circuit shown in FIG. 2 can be used for detecting positive charge simply by changing the potential VDIS so that transistor 5 is initially biased on and transistor 12 is initially biased off. Arrival of positive charge at electrode 1 then simply causes the circuit to operate in the reverse of way described for negative charge. However, a more satisfactory sensor for positive charge can be made by inverting the polarity of the supply rails $V_{dd}$ and $V_{ss}$ and changing the p-channel transistors to n-channel and v.v. Resistor 17 should also be relocated to between $V_{dd}$ and transistor 15.

As explained, the sensor may operate to record a continuous flux of charge (the "DC mode") if resistor 10 is omitted. Table 1 lists the optimum resistor values and transistor gate widths for negative pulse and negative "DC mode" operation, and table 2 lists further relevant transistor parameters for the negative pulse sensor. Typical performance characteristics of an array of sensors fabricated according to FIG. 2 are listed in table 3.

TABLE 1

| Circuit Parameters for different modes | | |
|---|---|---|
| Resistor | Neg. Pulse | Neg. DC |
| 11 | 1K | 1K |
| 7 | 50K | 80K |
| 8 | 15K | 10K |
| 6 | 80K | 80K |
| 19 | 200K | 80K |
| 17 | 8K | 8K |
| 10 | 200K | — |
| Transistor Gate Widths | | |
| 5 | 15μ | 30μ |
| 12 | 60μ | 30μ |
| 14 | 5μ | 30μ |
| 15 | 56μ | 56μ |
| 16 | 10μ | 10μ |

TABLE 2

| | Transistor dimensions for neg. pulse operation | | | |
|---|---|---|---|---|
| | Drain | | Source | |
| Transistor | Area (μ²) | Perimeter (μ) | Area (μ²) | Perimeter (μ) |
| 5 | 150 | 50 | 150 | 50 |
| 12 | 500 | 140 | 500 | 140 |
| 14 | 50 | 30 | 50 | 30 |
| 15 | 500 | 132 | 500 | 132 |
| 16 | 70 | 40 | 70 | 40 |

TABLE 3

| Performance Characteristics | |
|---|---|
| Electrode length | 4 mm |
| Electrode width | 15μ |
| Count rate/sensor | 5 MHz |
| Power dissipation/sensor | <1 mW |
| Data storage/sensor | 8 bit |
| Read time/sensor | $\approx 0.4 \times 10^{-6}$ s |
| Bakeout temperature | 120° C. |
| Power supply | 5 V |

Figure 3:
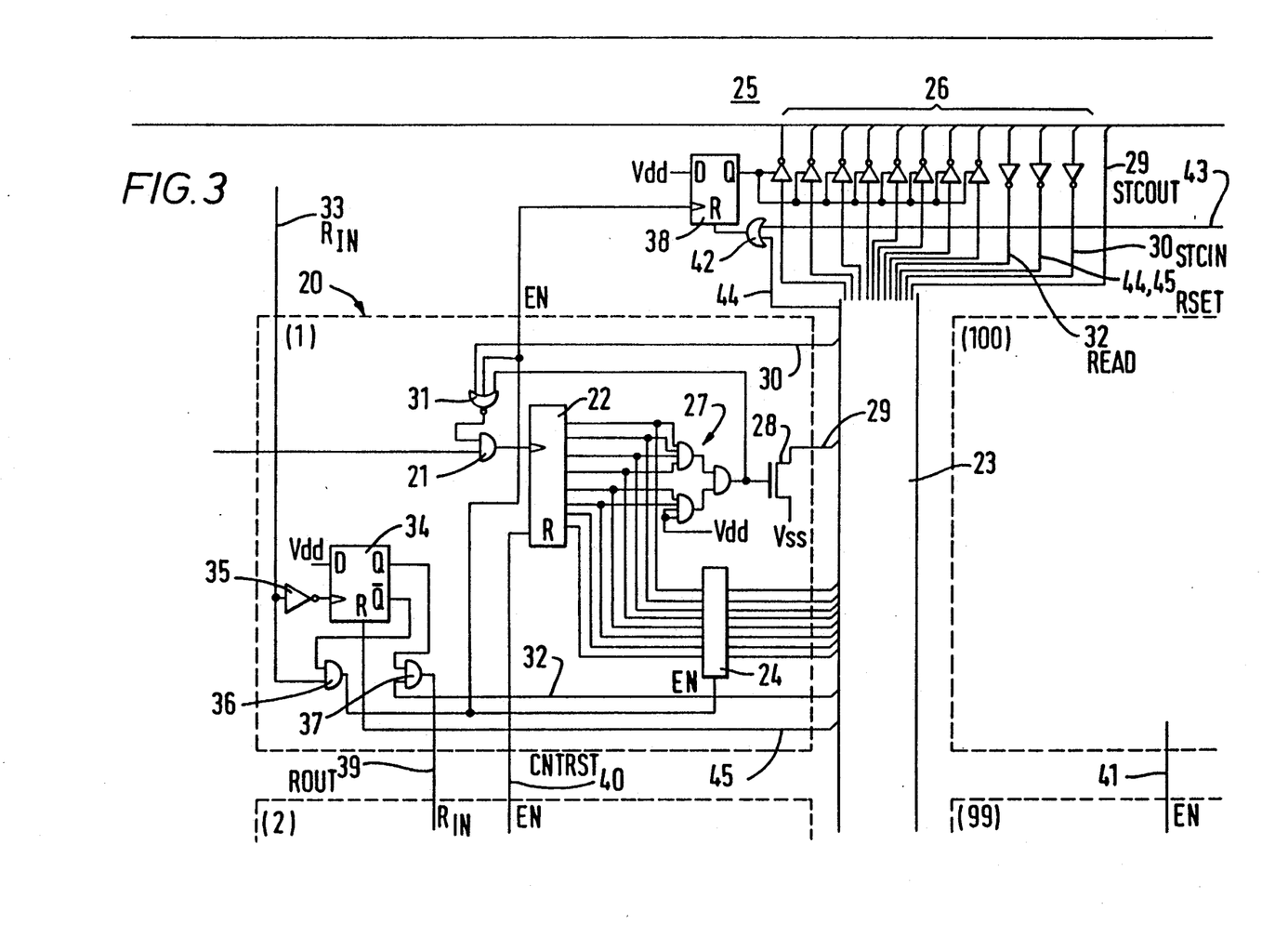
FIG. 3 is a circuit diagram of part of a multiple-channel sensor according to the invention.

The counting means 4 (FIG. 1) comprises a conventional CMOS 8 bit counter, and in the case of an array of sensors, logic is provided to interface the counters to a data bus to interface with an external computer FIG. 3 illustrates a preferred method of implementing this logic. The circuitry associated with each sensor is shown within the dashed box 20. The signal from the CMOS inverter (15, 16, FIG. 2) is fed via an AND gate 21 to an 8 bit counter 22, the 8 outputs of which are connected to a local bus 23 via eight tristate buffers 24. Each local bus 23 is able to serve approximately 100 counters and is connected to a main bus 25 via more tristate buffers 26.

The counting means can operate in either of two modes. In the first mode, the first counter to reach 252 counts, stops the counting on all the counters in the array, and initiates a read cycle of all the counters by an external computer. The relative intensities of the charge accumulated on each sensor is therefore undistorted, but because of the limited dynamic range imposed by the counter, small charges may be undetected. In the second mode, a counter reaching 252 counts simply is inhibited from acquiring further counts but counting continues uninterrupted on all the other counters in the array. In this mode the counters are read continuously by the external computer in the way described below. This makes it possible to detect smaller amounts of charge in the presence of much larger charges falling on other sensors, but these larger charges will not be properly measured. The FIGURE of 252 (rather than 255 for an 8 bit counter) is chosen so that any charge arriving during the period while the counter is being stopped does not interfere with the proper operation.

In the FIG. 3 circuit, when the second mode is selected, reading of the counters takes place continuously while data is being acquired, except at the counter actually being read at a given moment. The read cycle operates as follows. The $R_{in}$ line 33 of the first counter in the array is directly connected to the read line 32 which is common to all the sensors. At the start of the read cycle, the external computer asserts the read line 32 and consequently the $R_{in}$ line 33 of the first counter. This stops pulses reaching the counter input through the gates 36, 31 and 21 and enables the read out of the tristate buffer 24. At the same time the local bus 23 is connected to the main bus 25 by the bistable 38 which enables the buffers 26. The external computer than reads the output of counter 22 from the main bus 25 and deasserts the read line 32. Accordingly, the $R_{in}$ line 33 connected to the read line 32 is also deasserted, which causes the gate 35 to operate the bistable 34 to set the Q terminal high. Thus, the next time the external computer asserts the read line 32, $R_{out}$ on line 39 (connected to $R_{in}$ of the second counter) is asserted, and the contents of the counter of the second sensor are read out via the local and main buses in the same manner as above. Once the buffers of the second counter are enabled, a signal on line 40 resets the counter 22 of the first sensor to zero, ready for the next pulse accumulation. In this way the counters connected to the local bus 23 are read sequentially while only one of them is actually inhibited from acquiring data at any one time.

When the last counter on the bus 23 is read, the signal on its enable output 41 resets the counter of the previously read sensor and enables the next local bus to be read by asserting the $R_{in}$ line of the first sensor of the second local bus. The next read pulse on line 32 therefore enables that sensor and simultaneously disables the buffers 26 associated with the local bus 23 via the bistable 38 (of the first sensor on the second bus) which is connected via the line 43 to the gate 42 and the bistable 38 of the first local bus. At the same time, the enabling of the first sensor of the second bus causes the enabling of the tristate buffers connecting that bus to the main bus. In this way the external computer can read all the counters on the second bus, and subsequent local buses in turn.

When every detector has been read, the process is restarted by the external computer asserting the $R_{set}$ line 44, 45 for a short period. This resets all the bistables 34, 38 to an initial condition for the next complete cycle.

In order to zero all the counters it is necessary to perform a dummy read cycle while the external computer asserts the STCIN line 30 to inhibit the accumulation of data via the gates 31. As each counter is read it automatically resets the previous counter to zero.

In the first mode of operation the first counter to reach 252 counts asserts the STCOUT line 29 through the gate 27 and driver transistor 28. The external computer will recognise this and may assert STCIN to prevent further accumulation of data, and initiates a single complete read cycle as described above. When this is complete, the counters will have all been zeroed, and data acquisition may be restarted.

Figure 4:
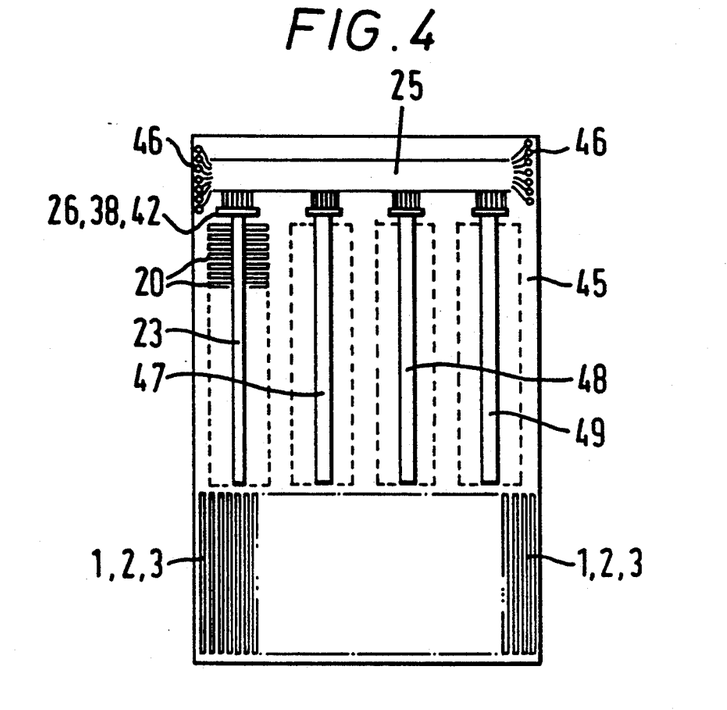
FIG. 4 shows the layout of a multiple-channel sensor according to the invention.

The circuits shown in FIGS. 2 and 3 are sufficiently small and of low enough power dissipation to allow 400 sensors / cm with electrodes 4 mm×15µ to be fabricated on a single substrate of approximately 1 cm×1.5 cm. The isolation provided by the tristate buffers and the bus architecture allows the total bus capacitance to be kept low enough to permit a read out time of less than 400 nS for each counter. The layout of a sensor array using the circuits of FIGS. 2 and 3 is shown in FIG. 4. The main bus 25 is fabricated along the top of the substrate 45 and terminates in connection pads 46 as shown. These can be used to connect the bus to another chip butted alongside it. A plurality of local buses 23, 47, 48, 49 are fabricated as shown and the tristate buffers and control logic (26, 38 and 42) for interfacing each local bus to the main bus is fabricated at their junctions At the end of the substrate 45 remote from the main bus 25 the individual detector electrodes 1 are fabricated as aluminium strips deposited on a relatively thick polyimide layer (10µ) which is coated over the substrate. The pulse forming circuits (FIG. 2) are fabricated on the substrate beneath the corresponding electrode The counter-bus interfaces (the parts of FIG. 3 enclosed in the box 20) are fabricated adjacent to the local buses in the region between the electrodes and the main bus and are connected to the appropriate pulse former by a metallic track extending parallel to the local bus.

Figure 5:
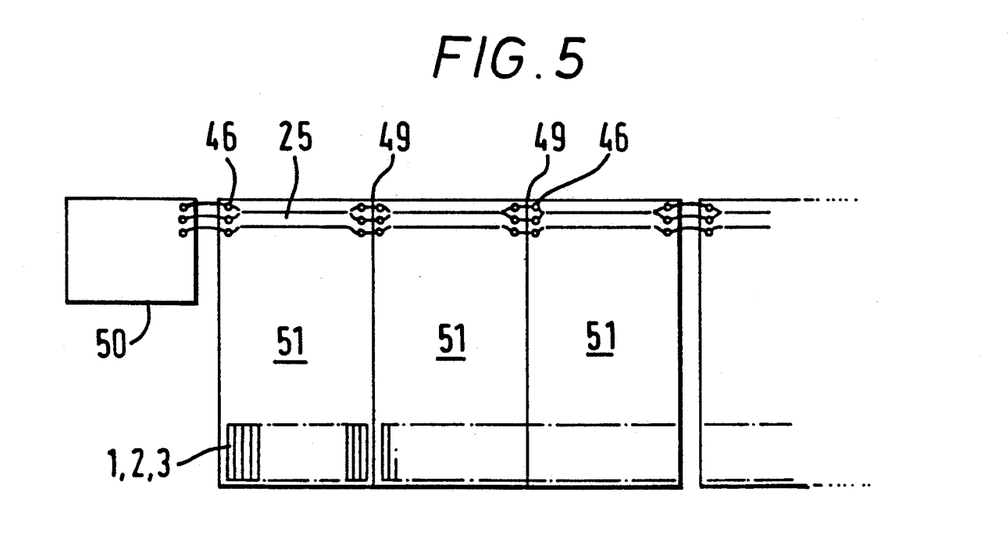
FIGS. 5 and 6 show different ways in which multiple-channel sensors according to the invention may be joined together to form a larger array of sensors.
Figure 6:
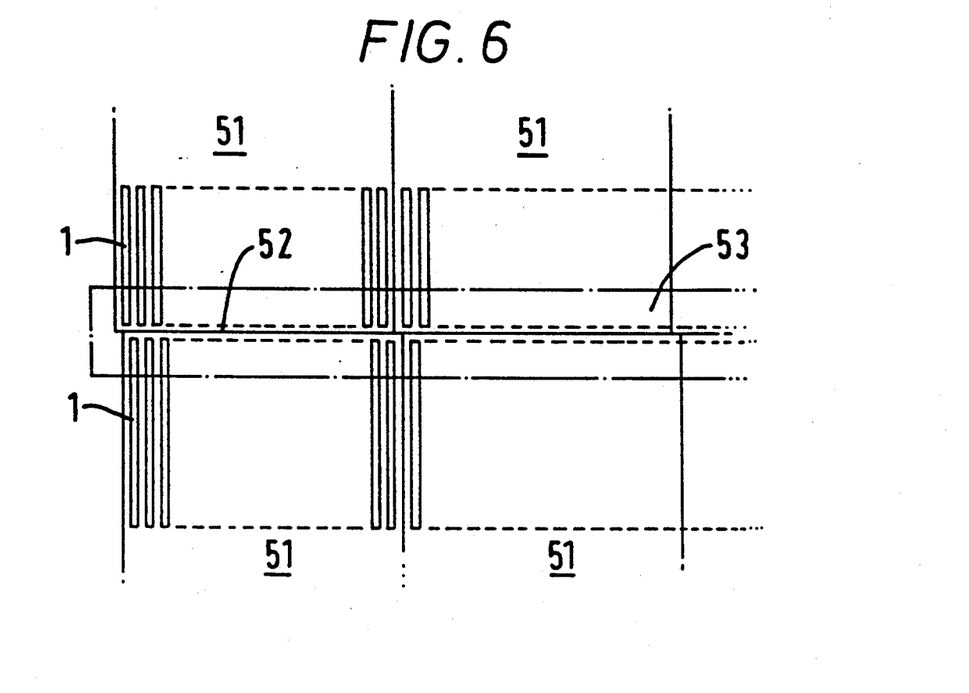

Several individual chips 51 (FIG. 5) of this type can be butted as shown in FIG. 6 and joined by wiring bridges 49 between the pads 46 on each chip to provide a detector having thousands of individual channels An I/O logic circuit 50 is also provided to interface the main bus and the control lines to the external computer.

Individual chips 51 may also be joined to provide an array of staggered detectors as shown in FIG. 6. For example, in the case of an ion detector for a mass spectrometer which comprises one or more channel plate multipliers, the joint 52 is disposed parallel to the dispersion axis of the spectrometer so that the mass spectrum is imaged in the region indicated by the dashed box 53. The chips 51 are staggered as shown by about one-half the width of the electrodes 1, thereby effectively increasing the resolution of the detector and minimising the problem of malfunctioning sensors because the same spectral information is available on the two chips on opposite sides of the joint 52.

Figure 7:
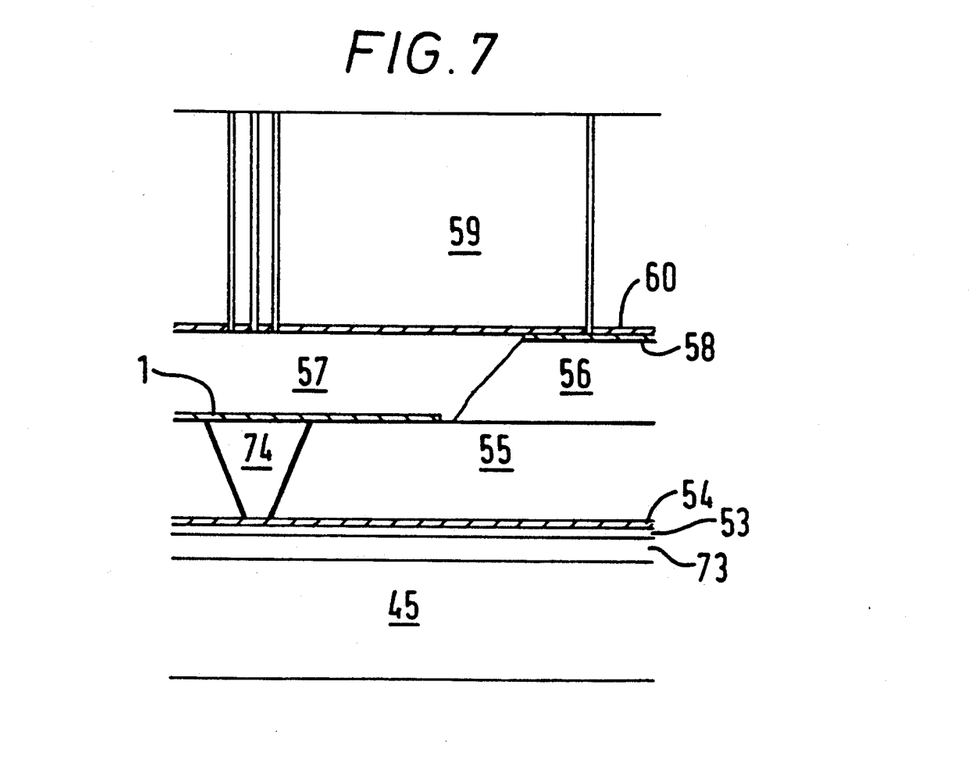
FIG 7 is a sectional view of an integrated circuit sensor according to the invention.

FIG. 7 shows a section through the region of the detector chip which supports the electrodes 1. The silicon substrate 45 supports a layer of CMOS circuitry 73 which comprises the circuitry of FIGS. 2 and 3. In this layer the resistors associated with the FIG. 2 circuit are formed in a layer of polysilicon. Alternatively, the resistors may be fabricated as depletion mode transistors as used in more conventional CMOS circuitry, but as the performance of these is not exactly equivalent to a simple resistor, the circuit parameters would require to be re-optimized. An insulating layer 53 of silicon dioxide is coated over layer 73 as is conventional, and aluminium interconnects are formed on this in the layer 54.

A relatively thick (e.g., 10-20 micron) layer 55 of polyimide is coated over layer 54 and the electrodes 1 are deposited on its upper surface in the form of aluminium tracks. A thick passivation layer 56 of polyimide is deposited over the electrode layer but is etched away in the form of a trough 57 which extends across all the electrodes perpendicularly to their longest axes. Another metal layer 58 is coated over the passivation layer 56. Usually, a channel plate electron multiplier 59 is disposed with its output face adjacent to the layer 58. Conventionally this will incorporate another metal layer 60 on the output face which determines the potential of the exit ends of the individual multiplier channels.

Figures 8A, 8B:
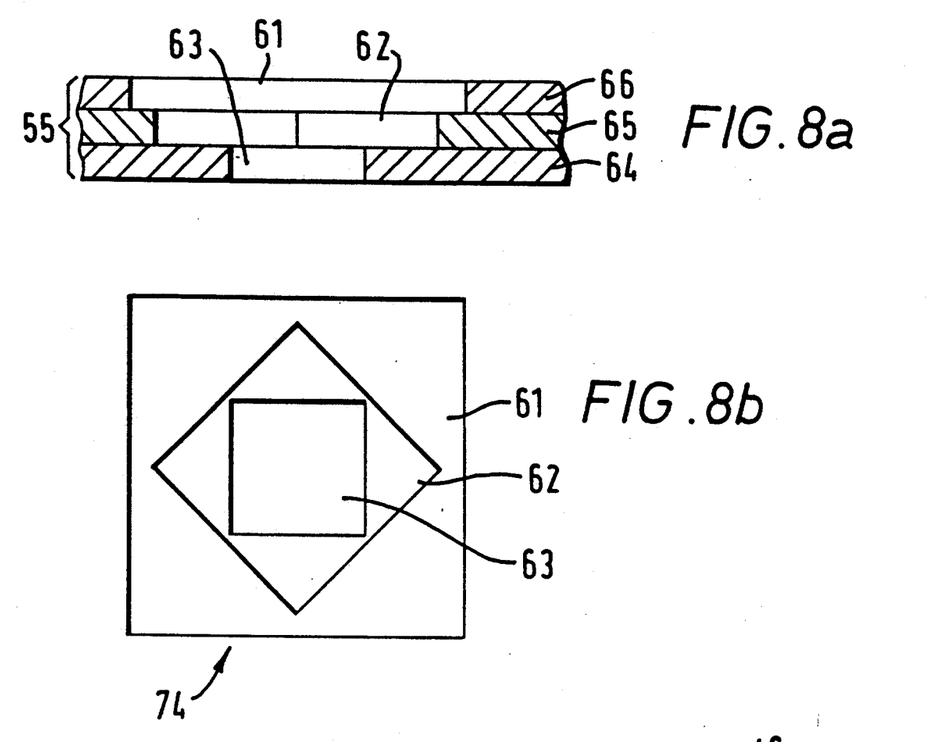
FIGS. 8a and 8b show how part of the sensor shown in FIG. 7 may be fabricated.

The thick polyimide layer 55 is necessary to ensure the lowest practical capacitance between the electrodes 1 and the adjacent circuitry. The formation of such layers such as 55 and 56, typically through the deposition and partial curing of several thinner layers, is standard practice but the formation of reliable contacts between the electrodes and the circuitry beneath the polyimide presents more difficulty. Although several different methods for making these connections exist, the most successful appears to be to etch a small square hole 63 (FIGS. 8a and 8b) in the first stage layer 64 and progressively larger holes (62, 61) in each subsequent layer (65, 66). The sides of each subsequent hole should be rotated by about 45° relative to the sides of the hole beneath it. This hole structure 74 can be metalized reliably to extend a contact through the composite layer of polyimide, as shown in FIG. 7.

Figure 10A:
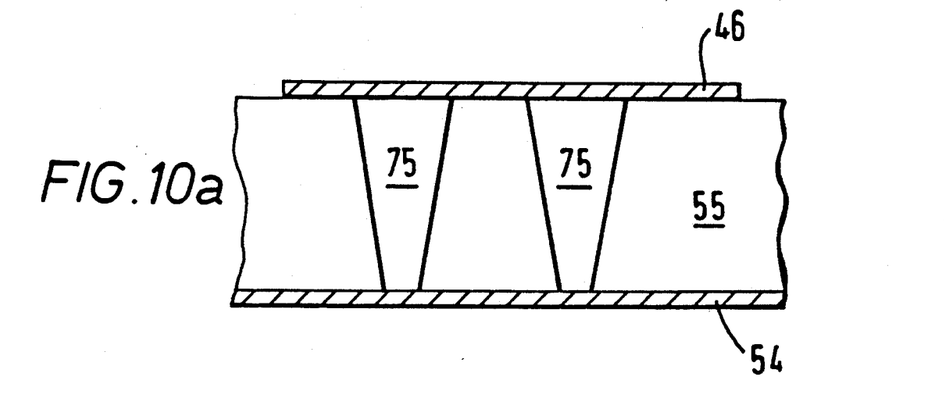
FIGS. 10a and 10b illustrate how another part of the sensor shown in FIG. 7 can be fabricated.
Figure 10B:
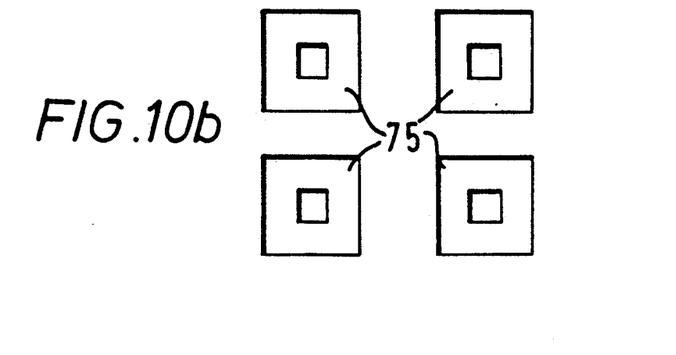

When chips are butted together as shown in FIG. 6, a relatively large number of connection pads 46 must be provided on the main bus 25. The total capacitance of these pads can reduce the speed of operation of the main bus if conventional pads are used. Low capacitance connection pads can be fabricated as shown, for example, in FIG. 10. Conventionally, a pad is formed by deposistion over a large metalized via in the polyimide layer to connect it to the metal layer beneath the polyimide. In FIGS. 10a and 10b, the anchoring of the pad to the lower metalized layer 54 beneath the polyimide layer 55 is made by several smaller metalized vias 75 which are of inherently lower capacitance than the conventional single large via. The vias 75 are conveniently formed in the same way as the vias 74 used to connect the electrodes 1 to the pulse forming circuits.

Figure 9:
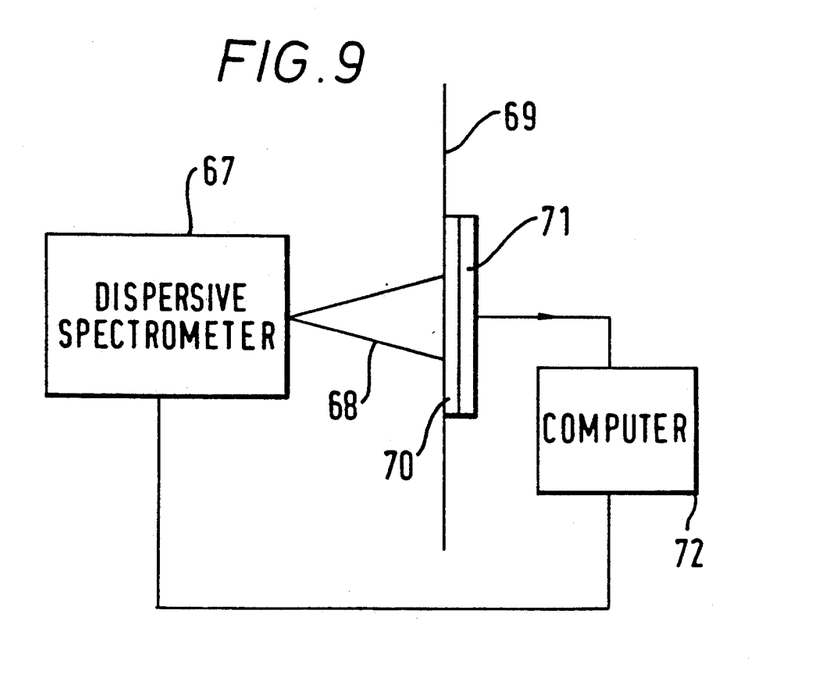
FIG. 9 is a block diagram of a spectrometer according to the invention.

A multiple channel detector according to the invention is particularly useful as a detector in dispersive spectrometers, particularly mass spectrometers, electron energy spectrometers or optical spectrometers (UV, IR, or visible light). In FIG. 9 a dispersive spectrometer 67 produces a beam 68 of particles or photons which are focused to image at least a part of the spectrum (mass, energy or wavelength, as appropriate) in an image focal plane 69. A channel plate electron multiplier 70 is disposed in the image focal plane 69 and converts the particle or photon image to an electron image. A sensor array 71 substantially as described is disposed to receive this image and a computer 72 is used both to control the sensor array 71 and the spectrometer 67 as well as to manipulate the spectral data from the array in an appropriate way. Such an arrangement is conventional, but particularly in the case of a high resolution mass spectrometer, the use of a detector with an array of several thousand channels, made possible by the present invention, increases in an economic way the sensitivity of the spectrometer to a level which cannot be achieved with prior detectors.

I claim:

1. A sensor for electrical charge comprising:
   a) an electrode for receiving charge;
   b) means connected to said electrode for initially setting the potential of said electrode to a selected potential;
   c) potential sensitive switching means connected to said electrode for monitoring the potential of said electrode, said switching means switching state whenever the potential of said electrode deviates from said initially set potential by more than a preselected amount;
   d) means connected to said electrode for restoring the potential of said electrode to substantially said selected potential whenever said switching means switches state; and
   e) means connected to said switching means for counting the number of times said switching means switches state to provide an indication of the electrical charge received by said electrode;

wherein said electrode, said means for initially setting said electrode potential, said potential sensitive switching means, said means for restoring and said means for counting are fabricated as an integrated circuit.

2. A sensor as claimed in claim 1 wherein said switching means is non-latching.

3. A sensor as claimed in claim 2 wherein said switching means is reset after the potential on said electrode returns to substantially said initially selected potential.

4. A sensor for negative charge as claimed in claim 1 wherein said switching means comprises a p-channel MOS transistor with its gate connected to said electrode and biased by said initially selected potential to a point such that it switches from a non-conducting to a conducting state whenever the potential of said electrode deviates by more than said preselected amount from said initially selected potential in response to the arrival of negative charge at said electrode.

5. A sensor for positive charge as claimed in claim 1 wherein said switching means comprises a n-channel MOS transistor with its gate connected to said electrode and biased by said initially selected potential to a point such that it switches from a non-conducting to a conducting state whenever the potential of said electrode deviates by more than said preselected amount from said initially selected potential in response to the arrival of positive charge at said elect-rode.

6. A sensor as claimed in claim 4 wherein said switching means further comprises a second MOS transistor driven by the the first MOS transistor to provide during the switching process a signal which is fed back to said first transistor to dynamically alter its bias and ensure a more positive switching action.

7. A sensor as claimed in claim 1 wherein said means for restoring comprises a MOS transistor which, in response to the operation of said switching means, switches to a conducting state to connect said electrode to said initially selected potential.

8. A sensor as claimed in claim 5 wherein said switching means further comprises a second MOS transistor driven by the first MOS transistor to provide during the switching process a signal which is fed back to said first transistor to dynamically alter its bias and ensure a more positive switching action.

9. An array of sensors as claimed in claim 1 and fabricated on a monolithic substrate, wherein:
   a) the switching means associated with each sensor is fabricated on said substrate below the electrode connected to it;
   b) a layer of polyimide is disposed between all said electrodes and the circuitry fabricated on said substrate; and
   c) digital circuit means are provided on said substrate for sequentially transferring the data stored in each said counter via a plurality of buffers to a bus for subsequent read out to an external computer.

10. An array of sensors as claimed in claim 9 arranged to receive from said external computer a series of read pulses and wherein said digital circuit means, in response to a said read pulse,
   a) stops the means for counting associated with a first sensor from responding to pulses from its associated switching means;
   b) enables the plurality of buffers associated with said first sensor to transfer the data stored in the associated means for counting to said bus where it can be read by said external computer;
   c) at the termination of said read pulse, causes the contents of the means for counting of a previously read second sensor to be zeroed to permit it again to respond to pulses from the switching means and enables a third, unread, sensor to be interrogated by the next said read pulse.

11. An array of sensors as claimed in claim 9, wherein a plurality of local buses are interfaced to a main bus for connection to an external computer, each said local bus is connected to a limited number of said sensors, and said digital circuit means provides on said substrate buffer means for connecting the local bus to which a said sensor is connected to said main bus whenever the plurality of buffers associated with said sensor are enabled to transfer data from its means for counting to said local bus.

12. A plurality of monolithic arrays as claimed in claim 9 array of sensors, joined to provide a substantially continuous 13. A multiple channel detector for particles or photons comprising multiple-channel electron-multiplying means responsive to said particles or photons and an array of sensors according to claim 9, said array of sensors receiving the output of said electron-multiplying means.

14. A dispersive spectrometer for photons or particles having a focal plane wherein at least a part of the spectrum it produces is simultaneously imaged, said spectrometer comprising a multiple channel detector as claimed in claim 13 disposed in said focal plane.

15. A spectrometer as claimed in claim 14 which disperses only along one axis and wherein said detector comprises two arrays of sensors joined along a line parallel to or coincident with said axis so that at least a part of the spectrum is imaged on said arrays simultaneously.

16. A spectrometer as claimed in claim 15 wherein said arrays are staggered so that the electrodes of one array are displaced from those in the other array by approximately one-half their width.

17. A spectrometer as claimed in claim 14 which disperses charged particles according to their mass-to-charge ratios.

18. A sensor for electrical charge comprising:
   a) an electrode for receiving charge;
   b) means connected to said electrode for initially setting the potential of said electrode to a selected potential;
   c) potential sensitive switching means connected to said electrode for monitoring the potential of said electrode, said switching means switching state whenever the potential of said electrode deviates from said initially set potential by more than a preselected amount;
   d) means connected to said electrode for immediately restoring the potential of said electrode to substantially said selected potential whenever said switching means switches state;
   e) means connected to said switching means for continuously restoring the potential of said electrode towards said selected potential; and
   f) means connected to said switching means for counting the number of times said switching means switches state to provide an indication of the electrical charge received by said electrode;
wherein said electrode, said means for initially setting said electrode potential, said potential sensitive switching means, said means for restoring and said means for counting are fabricated as an integrated circuit.

19. A sensor as claimed in claim 18 wherein said switching means is non-latching.

20. A sensor as claimed in claim 19 wherein said switching means is reset after the potential on said electrode returns to substantially and initially selected potential.

21. A sensor for negative charge as claimed in claim 18 wherein said switching means comprises a p-channel MOS transistor with its gate connected to said electrode and biased by said initially selected potential to a point such that it switches from a non-conducting to a conducting state whenever the potential of said electrode deviates by more than said preselected amount from said initially selected potential in response to the arrival of negative charge at said electrode.

22. A sensor for positive charge as claimed in claim 18 wherein said switching means comprises a n-channel MOS transistor with its gate connected to said electrode and biased by said initially selected potential to a point such that it switches from a non-conducting to a conducting state whenever the potential of said electrode deviates by more than said preselected amount from said initially selected potential in response to the arrival of positive charge at said electrode.

23. A sensor as claimed in claim 21 wherein said switching means further comprises a second MOS transistor driven by the first MOS transistor to provide during the switching process a signal which is fed back to said first transistor to dynamically alter its bias and ensure a more positive switching action.

24. A sensor as claimed in claim 22 wherein said switching means further comprises a second MOS transistor driven by the first MOS transistor to provide during the switching process a signal which is fed back to said first transistor to dynamically alter its bias and ensure a more positive switching action.

25. A sensor as claimed in claim 18 wherein said for immediately restoring comprises a MOS transistor which, in response to the operation of said switching means, switches to a conducting state to connect said electrode to said initially selected potential.

26. A sensor as claimed in claim 19 wherein said means for continuously restoring comprises a resistive path between said electrode and a point maintained at said initially selected potential so that the potential of said electrode is continuously restored towards said initially selected potential at a rate dependent on the value of said resistive path and the capacitance associated with said electrode.

27. An array of sensors as claimed in claim 18 and fabricated on a substrate, wherein:
   a) the switching means associated with each sensor is fabricated on said substrate below the electrode connected to it;
   b) a layer of polyimide is disposed between all said electrodes and the circuitry fabricated on said substrate; and
   c) digital circuit means are provided on said substrate for sequentially transferring the data stored in each said counter via a plurality of buffers to a bus for subsequent read out to an external computer.

28. An array of sensors as claimed in claim 27 arranged to receive from said external computer a series of read pulses and wherein said digital circuit means, in response to a said read pulse,
   a) stops the means for counting associated with a first sensor from responding to pulses from its associated switching means;
   b) enables the plurality of buffers associated with said first sensor to transfer the data stored in the associated means for counting to said bus where it can be read by said external computer;

c) at the termination of said read pulse, causes the contents of the means for counting of a previously read second sensor to be zeroed to permit it again to respond to pulses from the switching means and enables a third, unread, sensor to be interrogated by the next said read pulse.

29. An array of sensors as claimed in claim 27 wherein a plurality of local buses are interfaced to a main bus for connection to an external computer, each said local bus is connected to a limited number of said sensors, and said digital circuit means provides on said substrate buffer means for connecting the local bus to which a said sensor is connected to said main bus whenever the plurality of buffers associated with said sensor are enabled to transfer data from its means for counting to said local bus.

30. A plurality of arrays as claimed in claim 27 joined to provide a substantially continuous array of sensors.

31. A multiple channel detector for particles or photons comprising multiple-channel electron-multiplying means responsive to said particles or photons and an array of sensors according to claim 27, said array of sensors receiving the output of said electron-multiplying means.

32. A dispersive spectrometer for photons or particles having a focal plane wherein at least a part of the spectrum it produces is simultaneously imaged, said spectrometer comprising a multiple channel detector as claimed in claim 31 disposed in said focal plane.

33. A spectrometer as claimed in claim 32 which disperses only along one axis and wherein said detector comprises two arrays of sensors joined along a line parallel to or coincident with said axis so that at least a part of the spectrum is imaged on said arrays simultaneously.

34. A spectrometer as claimed in claim 33 wherein said arrays are staggered so that the electrodes of one array are displaced from those in the other array by approximately one-half their width.

35. A spectrometer as claimed in claim 32 which disperses charged particles according to their mass-to-charge ratios.

36. A sensor for electrical charge comprising:
a) an electrode for receiving charge;
b) means connected to said electrode for initially setting the potential of said electrode to a selected potential;
c) potential sensitive switching means connected to said electrode for monitoring the potential of said electrode, said switching means switching state whenever the potential of said electrode deviates from said initially set potential by more than a preselected amount;
d) means connected to said electrode for continuously restoring the potential of said electrode towards said selected potential; and
e) means connected to said switching means for counting the number of times said switching means switches state to provide an indication of the electrical charge received by said electrode;

wherein said electrode, said means for initially setting said electrode potential, said switching means, said means for restoring and said means for counting are fabricated as an integrated circuit.

37. A sensor as claimed in claim 36 wherein said means for restoring comprises a resistive path between said electrode and a point maintained at said initially selected potential so that the potential of said electrode is continuously restored towards said initially selected potential at a rate dependent on the value of said resistive path and the capacitance associated with said electrode.

38. A multiple channel detector for particles or photons comprising multiple-channel electron-multiplying means responsive to said particles or photons and an array of sensors according to claim 36, said array of sensors receiving the output of said electron-multiplying means.

39. A dispersive spectrometer for photons or particles having a focal plane wherein at least a part of the spectrum it produces is simultaneously imaged, said spectrometer comprising a multiple channel detector as claimed in claim 36 disposed in said focal plane.

* * * * *

UNITED STATES PATENT AND TRADEMARK OFFICE
CERTIFICATE OF CORRECTION

PATENT NO. : 5,296,816

DATED : March 22, 1994

INVENTOR(S) : Birkinshaw

It is certified that error appears in the above-identified patent and that said Letters Patent is hereby corrected as shown below:

In column 14, line 21, delete "elect-rode" and insert --electrode--.

In column 15, line 11, delete "monolithic".

In column 15, line 12, delete "array of sensors".

In column 16, line 1, delete "and" and insert --said--.

UNITED STATES PATENT AND TRADEMARK OFFICE
CERTIFICATE OF CORRECTION

PATENT NO. : 5,296,816

DATED : March 22, 1994

INVENTOR(S) : Birkinshaw

It is certified that error appears in the above-identified patent and that said Letters Patent is hereby corrected as shown below:

In column 16, line 33, insert --means-- after the word "said".

In column 15, line 13, insert --array of sensors-- after the word "continuous".

In column 15, line 62, delete "potential sensitive" after the word "said".

Signed and Sealed this

Twenty-seventh Day of September, 1994

Attest:

BRUCE LEHMAN

*Attesting Officer*  *Commissioner of Patents and Trademarks*